UNITED STATES PATENT OFFICE.

FRITZ POTT, OF FRIEDENAU, NEAR BERLIN, GERMANY.

PROCESS OF MANUFACTURING FILTERING MATERIAL.

1,089,346.  Specification of Letters Patent.  Patented Mar. 3, 1914.

No Drawing.  Application filed August 16, 1913. Serial No. 785,174.

*To all whom it may concern:*

Be it known that I, FRITZ POTT, a citizen of the German Empire, and residing at Friedenau, near Berlin, Germany, have invented a certain new and useful Improved Process of Manufacturing Filtering Material, of which the following is a specification.

My invention relates to a process of manufacturing a filtering material, which not only has a high surface action and serves as a substitute for bone-charcoal and similar substances but also has the important advantage as compared with these substances that its action and form can be predetermined as desired.

To this end I impregnate a porous mineral substance with peptonic albuminoids, and then dry the porous mineral product. I then strongly calcine the resulting substance, while simultaneously excluding the air therefrom, so that only carbon and certain salts remain. These salts are then washed out with water or in some cases with acids, while the carbon remains firmly adherent to the mineral substance. The filtering material produced in this manner can be employed for cleaning or purifying a very large variety of liquids, *e. g.* for removing the coloring substances and salts from liquids of all kinds. As examples of the purposes of employment may be mentioned, cleaning juices, refining oils and purifying water.

The purifying action of the new filtering material is based on the following considerations. The extremely finely distributed carbon has quite as high a surface action as that due to the carbon obtained either from the glue-yielding substances in bones or from the blood, which latter carbon is extensively employed in practice as is well-known. The peptonic condition of the albuminous solution enables the liquid to penetrate into the minutest pores of the starting material, so that the active carbon is uniformly distributed and very effective throughout the resulting product. Moreover my new filtering material can be regenerated in the same way as bone-charcoal.

The filtering material I obtain has very special advantages when it is employed for purifying water.

As is well-known, when removing iron and hardness from water a certain time must be allowed before precipitated matter can be separated out. It is also well-known that by allowing the particular reactions to take place in the presence of previously formed deposits of a similar or at least nearly related kind, the operation can be accelerated by so-called contact action. In practice it is the filtering material that is almost exclusively the carrier of the deposits which act in this manner. This can be very well observed in the gravel-filter. Namely, when a gravel-filter is new or thoroughly washed with water while simultaneously stirred, so that there is no iron deposit present, the power of the filter to remove iron is not approximately equal to that of a filter of this kind which had become charged with deposit and which had been some time at work. The gravel-filter must, however, be thoroughly washed from time to time, because it would otherwise become choked and allow too little water to pass through. Plants for removing iron by gravel filtration are therefore subject to continual variation in respect to their qualitative output. Even when the smooth gravel is replaced by a more porous material of an inorganic nature with a view to encouraging the formation in the pores of a firmly adherent layer of deposit, the conditions are practically unimproved, for in this case also the fine particles are much too readily washed out of the pores for the variable action already described with reference to the gravel-filter to be eliminated.

When organic material, *e. g.* wood-wool, is employed the action is different. In this case the deposited particles which are in direct contact with the fibers adhere so firmly that they cannot be dislodged when the filter is washed. Consequently, it is only when the filter is newly filled with wood-wool that the effect is a very slight one; a time then comes when the deposit settles in the pores and can only partly be washed out; and finally the period of proper action arrives, *i. e.* when the fiber is saturated. After that the freshly added deposit can be washed out, and variations no longer occur.

Systems of abstracting iron with organic filtering material are however subject to certain hygienic defects. They favor to quite a remarkable extent the growth of fungus, *e. g.* schizomycetes. The better the effect in abstracting the iron, the more serious does the hygienic defect become.

According to my invention I obviate the above defects, and thus not only make an important industrial advance, but also provide a process of treating a material of inorganic origin in such manner that the finest deposits adhere to and in it so firmly that these deposits cannot be wholly removed when washing out the filter even when agitating devices are simultaneously employed. In this manner the effect I obtain qualitatively is equal to that obtained with wood-wool.

In one very advantageous form of carrying my process into practice I produce the layer of carbon by first separating albuminoids from slaughter-house blood by means of a 15% alkali solution, then impregnating suitable stones, bricks or the like with this solution, drying the impregnated stones, thereupon strongly calcining them while excluding the air, and finally washing out the salts. The stones or bricks preliminarily prepared in this manner act in the manner described as organic substances, i. e. even when carefully washed they contain so much catalytically acting deposit in themselves that the filter made from them works uniformly and, in respect to qualitative results, satisfactorily.

In order to obtain the desired action uniformly from the beginning I may deposit metallic hydroxid and calcium carbonate in the stones by impregnating them in known manner with several reagents which so act on one another as to form a deposit.

Example: Granulted porous bricks are first impregnated with a 5%, aqueous peptonic solution produced by means of alkalis, then dried, calcined, washed in a suitable vessel, and then impregnated with solutions of the salts of iron, aluminium, manganese-nickel, cobalt. By means of lime water, to which gypsum has been added, the hydroxids are now precipitated and afterward by employing a soluble carbonate, calcium carbonate is precipitated from the gypsum. According to known processes for charging inorganic filtering materials with carbon, these materials have either been treated with gaseous heavy hydrocarbons under the action of heat with the object of forming soot, or they have been intimately mixed with fine pulverized brown coal or lignite and then calcined. In my process, however, by impregnating the filtering material with a carboniferous liquid and heating the same, I obtain not only a very adherent precipitate of very active animal charcoal, but also a very fine and regular distribution such as is not obtainable by the known processes.

I claim:—

1. A process of making a filtering material, consisting in impregnating a porous mineral substance with a solution of albuminoids, in drying the same, in thereupon highly heating the same while excluding the air therefrom, and in washing the same, and in then loading the treated mineral substance with a deposit of an hydroxid of a metal mixed with calcium carbonate.

2. A process of making a filtering material, consisting in impregnating a porous mineral substance with a solution of albuminoids, in drying the same, in thereupon highly heating the same while excluding the air therefrom, and in washing the same, and in then loading the treated mineral substance with a deposit of iron mixed with calcium carbonate.

In testimony whereof, I affix my signature in the presence of two witnesses.

FRITZ POTT.

Witnesses:
 HENRY HASPER,
 ARTHUR SCHROEDER.